United States Patent
Cui et al.

(10) Patent No.: US 10,654,120 B2
(45) Date of Patent: May 19, 2020

(54) METHOD, BRAZED ARTICLE, AND BRAZING ASSEMBLY

(71) Applicant: GENERAL ELECTRIC COMPANY, Schenectady, NY (US)

(72) Inventors: Yan Cui, Greer, SC (US); Brian Leslie Henderson, Simpsonville, SC (US); Brian Lee Tollison, Honea Path, SC (US); Srikanth Chandrudu Kottilingam, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 496 days.

(21) Appl. No.: 15/373,895

(22) Filed: Dec. 9, 2016

(65) Prior Publication Data
US 2018/0161902 A1  Jun. 14, 2018

(51) Int. Cl.
*B23K 1/00* (2006.01)
*B23K 1/20* (2006.01)
*B23K 101/00* (2006.01)
*B23K 101/06* (2006.01)

(52) U.S. Cl.
CPC .............. *B23K 1/0018* (2013.01); *B23K 1/20* (2013.01); *B23K 2101/001* (2018.08); *B23K 2101/06* (2018.08); *Y10T 403/473* (2015.01); *Y10T 403/479* (2015.01)

(58) Field of Classification Search
CPC .. B23K 1/0018; B23K 2001/001; B23K 1/04; B23K 1/06; Y10T 403/473; Y10T 403/479
USPC ................................................. 403/268, 272
See application file for complete search history.

(56) References Cited

U.S. PATENT DOCUMENTS

| | | | |
|---|---|---|---|
| 3,078,551 A | 2/1963 | Patriarca et al. | |
| 8,876,425 B2 * | 11/2014 | Wilson | F16B 11/008 285/286.2 |
| 9,610,451 B2 * | 4/2017 | Markham | A61N 1/3754 |
| 10,036,411 B2 * | 7/2018 | Kluge | B29C 70/72 |

(Continued)

FOREIGN PATENT DOCUMENTS

WO  2007070989 A1  6/2007

OTHER PUBLICATIONS

European Search Report for EP17204979.3, dated Jun. 11, 2018, 8 pages.

*Primary Examiner* — Josh Skroupa
(74) *Attorney, Agent, or Firm* — McNees Wallace & Nurick LLC (57) ABSTRACT

A method includes heating a brazing material in a braze chamber of a first component to a braze temperature to melt the brazing material. The brazing material flows from the braze chamber, through at least one internal channel of the first component, and into a braze gap between the first component and a second component to braze the first component to the second component. A brazed article includes a first component having a braze chamber and at least one internal channel extending from the braze chamber to an external surface, a second component having at least one braze surface separated from the external surface of the first component by a braze gap, and a braze material in the braze gap. A braze assembly includes a first component, a second component, and a brazing material in the braze chamber.

18 Claims, 5 Drawing Sheets

(56) References Cited

U.S. PATENT DOCUMENTS

2015/0308449 A1* 10/2015 Bareiss .................. F01D 5/187
  416/90 R
2016/0287052 A1   10/2016 Bruesehaber et al.

* cited by examiner

METHOD, BRAZED ARTICLE, AND BRAZING ASSEMBLY

FIELD OF THE INVENTION

The present embodiments are directed to methods of brazing, brazed articles, and brazing assemblies. More specifically, the present embodiments are directed to methods, articles, and assemblies for brazing a braze gap between two surfaces.

BACKGROUND OF THE INVENTION

Tooling lugs, located in the outer side wall of turbine nozzles, are a pair of handles with two holes. The function of the holes in the tooling lugs is to connect with the pins in the fixture to hold the nozzle for machining. During machining, a datum plane is used as a reference surface to locate all of the other positions. The tolerance between the tooling lugs and datum plane is very important, because it is directly related to the other machining tolerances and to the part assembly.

When the position or the diameter of a hole of a tooling lug is outside of a predetermined tolerance, the hole is conventionally plugged and re-drilled. The predetermined tolerance may be less than about 2.5 mm (about 0.10"). Conventionally, the hole is plugged by welding, but this may cause distortion or micro-cracking in the superalloy material of the tooling lug.

Brazing is a process of filling a void space within a metal item or between two or more metal items. A filler braze metal material melts and flows into a joint between the two metal items or into a crack or gap within a metal item. The filler braze metal material has a lower melting point than the metal items such that the metal items do not melt during the brazing process. The filler braze metal material ideally flows into the joint, crack, or gap by capillary action. The filler metal is heated to slightly above its melting (liquidus) temperature in a suitable atmosphere, usually in an inert atmosphere environment or in a vacuum furnace, to melt and flow, and then cools to fill the crack or gap or join the two metal items together. Brazing is capable of joining the same or different metals with considerable strength.

BRIEF DESCRIPTION OF THE INVENTION

In an embodiment, a method includes heating a brazing material in a braze chamber of a first component to a braze temperature to melt the brazing material. The brazing material flows from the braze chamber, through at least one internal channel of the first component, and into a braze gap between the first component and a second component to braze the first component to the second component.

In another embodiment, a brazed article includes a first component having a braze chamber and at least one internal channel extending from the braze chamber to an external surface of the first component, a second component having at least one braze surface separated from the external surface of the first component by a braze gap, and a braze material in the braze gap. The first component is brazed to the second component by the braze material in the braze gap.

In another embodiment, a braze assembly includes a first component having a braze chamber and at least one internal channel extending from the braze chamber to an external surface of the first component, a second component having at least one braze surface separated from the external surface of the first component by a braze gap, and a brazing material in the braze chamber.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a method of brazing, a brazed article, and a brazing assembly including a braze chamber and a braze gap.

Embodiments of the present disclosure, for example, in comparison to concepts failing to include one or more of the features disclosed herein, permit a high-quality, narrow-gap braze, provide a high-quality braze joint, provide a narrow-gap braze joint with a tight tolerance, provide a different method for feeding braze filler to a joint, provide a braze filler in the form of a powder with no binder, apply well to nickel-based braze fillers that are difficult to form into structures, such as wires and rings, due to very low ductility, achieve a predetermined exact braze gap size design, eliminate a detrimental phase, such as a eutectic phase, promote easier part assembly, easily control design during production, or a combination thereof.

Figure 1:
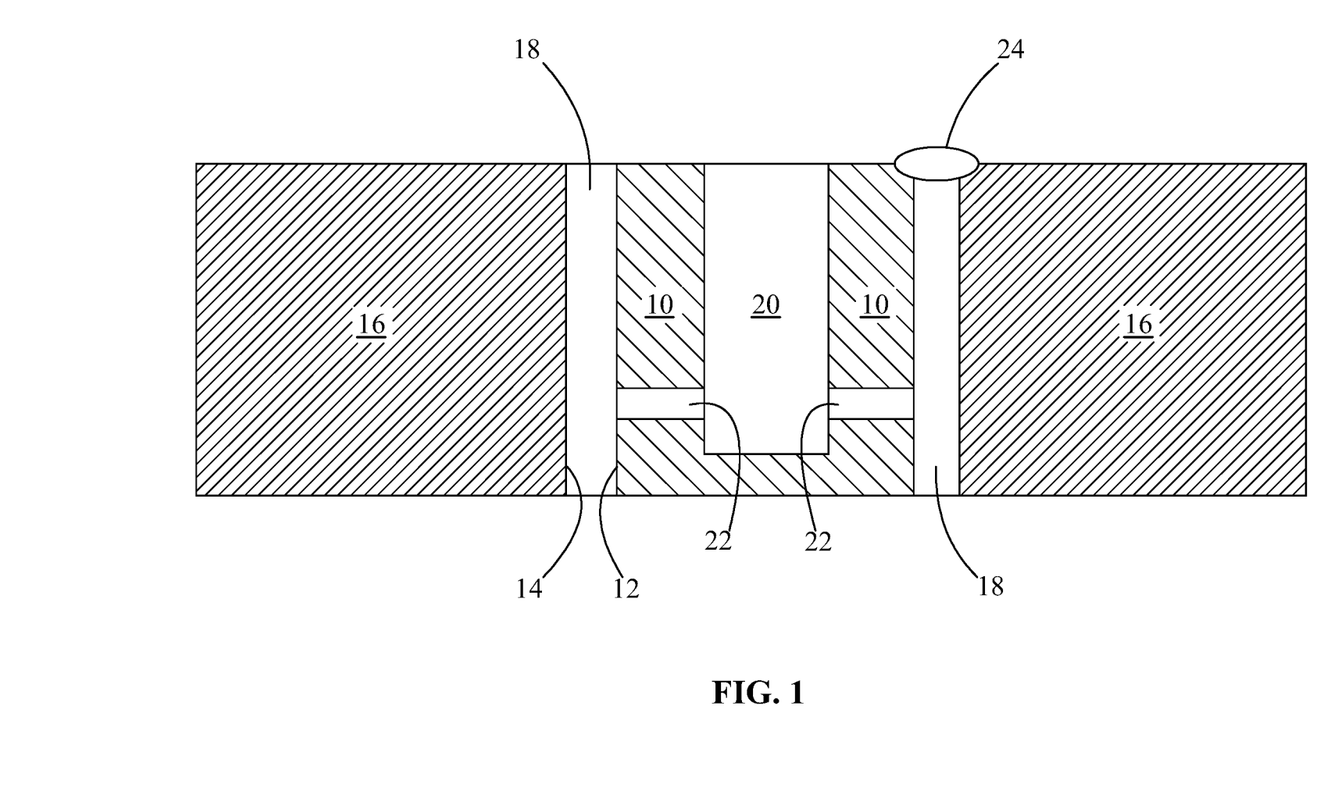
FIG. 1 is a schematic cross sectional view of a first component and a second component in an embodiment of the present disclosure.

Referring to FIG. 1, a first component 10 is formed and arranged to have an external surface 12 a predetermined distance away from a braze surface 14 of a second component 16. The predetermined distance defines a braze gap 18 between the external surface 12 of the first component 10 and the braze surface 14 of the second component 16. The first component 10 includes a braze chamber 20 and at least one internal channel 22 providing fluid communication between the braze chamber 20 and the external surface 12 of the first component 10, and hence the braze gap 18. A connector 24 between the first component 10 and the second component 16 may be applied to maintain the relative location of the first component 10 with respect to the second component 16, thereby maintaining the braze gap 18. In some embodiments, the connector 24 is a tack weld.

Figure 2:
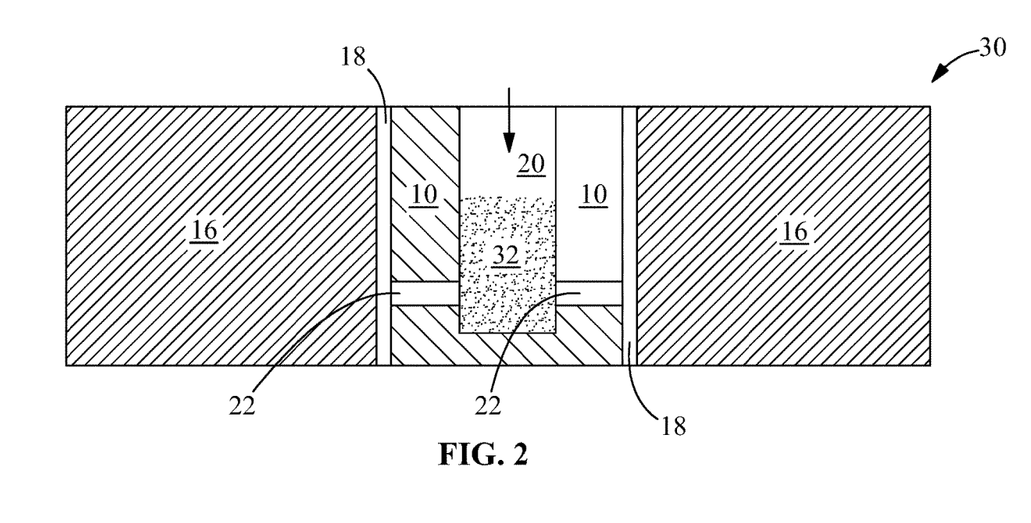
FIG. 2 is a schematic cross sectional view of a braze assembly including the first component and the second component of FIG. 1 in an embodiment of the present disclosure.

FIG. 2 shows a braze assembly 30 including the first component 10, the second component 16, and a brazing material 32 located in the braze chamber 20 of the first component. The brazing material 32 is provided in a quantity sufficient to flow and fill the volume of void space the braze gap 18 upon heating the brazing material 32 to a braze temperature sufficient to melt the brazing material 32.

Figure 3:
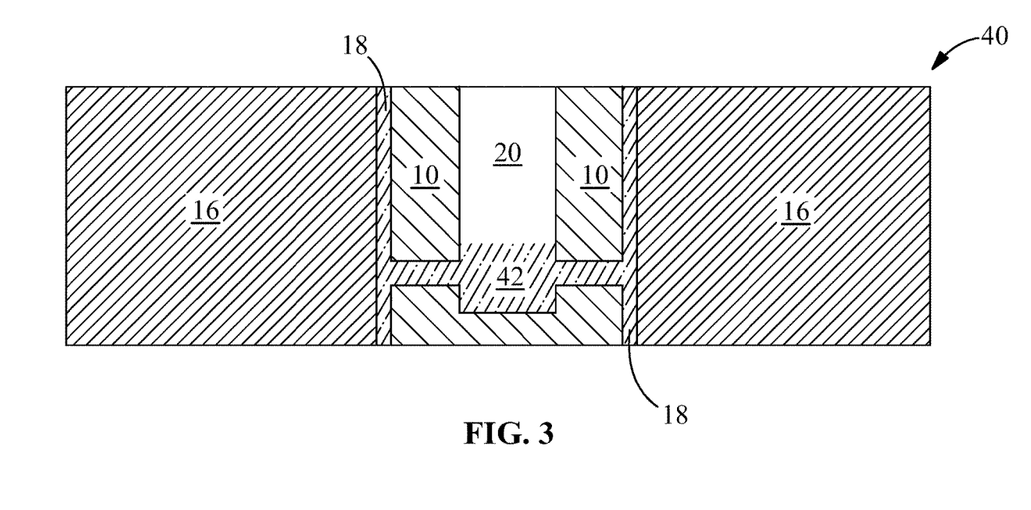
FIG. 3 is a schematic cross sectional view of a brazed article from the braze assembly of FIG. 2 in an embodiment of the present disclosure.

FIG. 3 shows a brazed article 40 including the first component 10 brazed to the second component 16 by a braze material 42 in the braze gap 18. The braze material 42 has solidified from the melted brazing material 32 after heating the brazing material 32 in the braze chamber 20 to a braze temperature to melt the brazing material 32, permitting the melted brazing material 32 to flow into the internal channel 22 and then into the braze gap 18, and allowing the liquid brazing material 32 to cool to a solid braze material 42.

Figure 4:
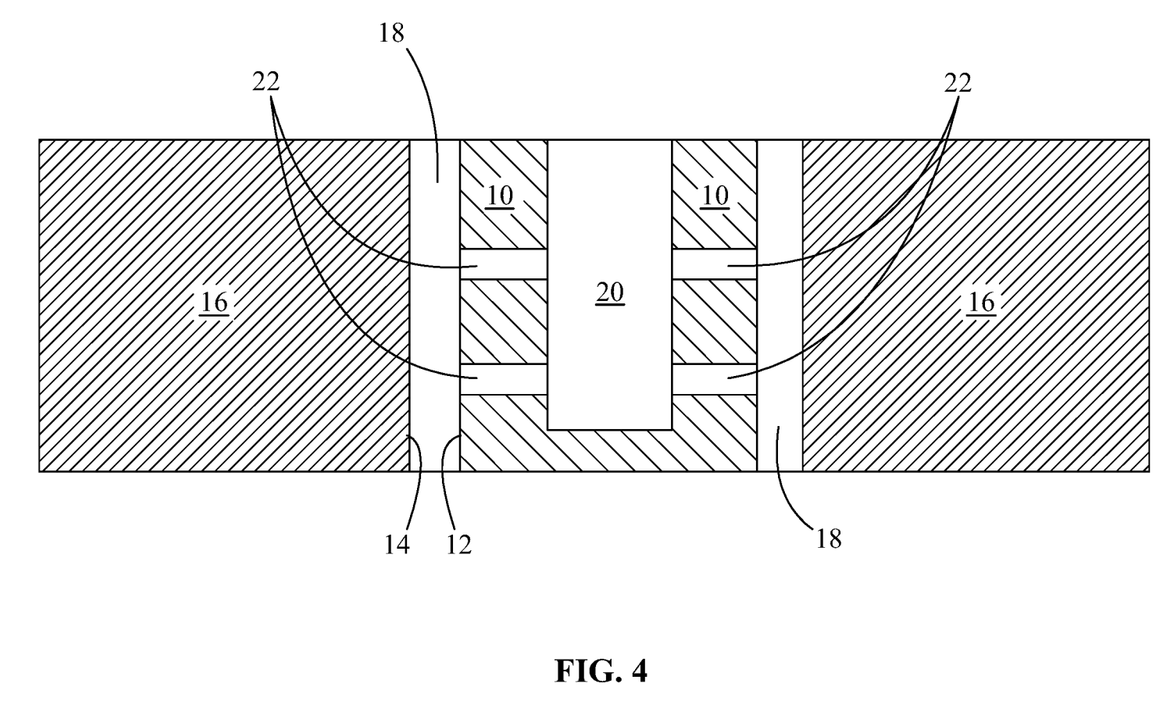
FIG. 4 is a schematic cross sectional view of a first component and a second component in another embodiment of the present disclosure.

FIG. 4 shows an alternative design of a first component 10 in a second component 16. The first component 10 includes internal channels 22 at more than one location along the length of the first component 10. When brazing a braze gap 18 of sufficient length, the addition of internal channels 22 at different locations along the length of the first component 10, and hence at different locations along the length of the braze gap 18, reduces the amount of time for the brazing material 32 to flow and fill the braze gap 18, thereby reducing the brazing time.

Figure 5:
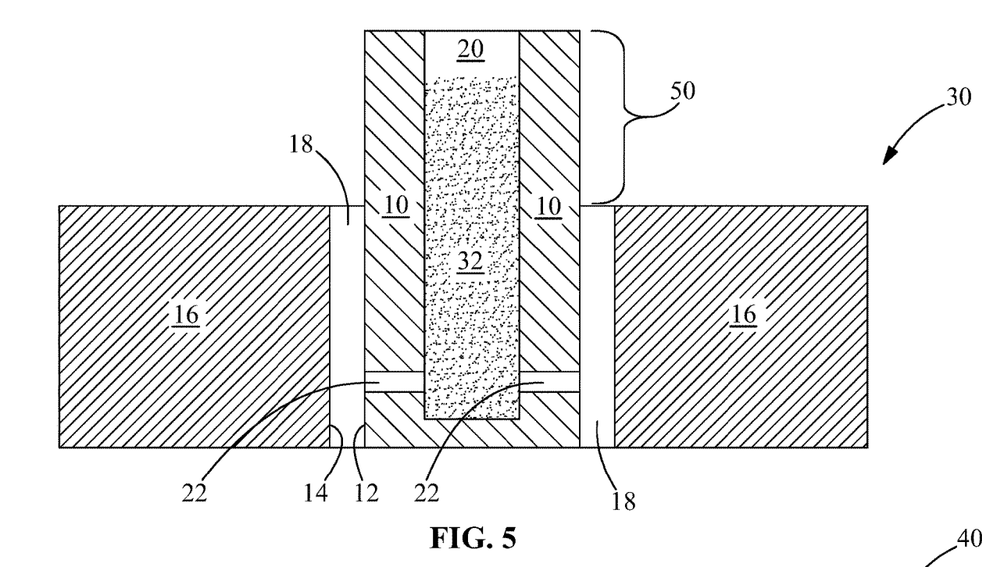
FIG. 5 is a schematic cross sectional view of another braze assembly in an embodiment of the present disclosure.
Figure 6:
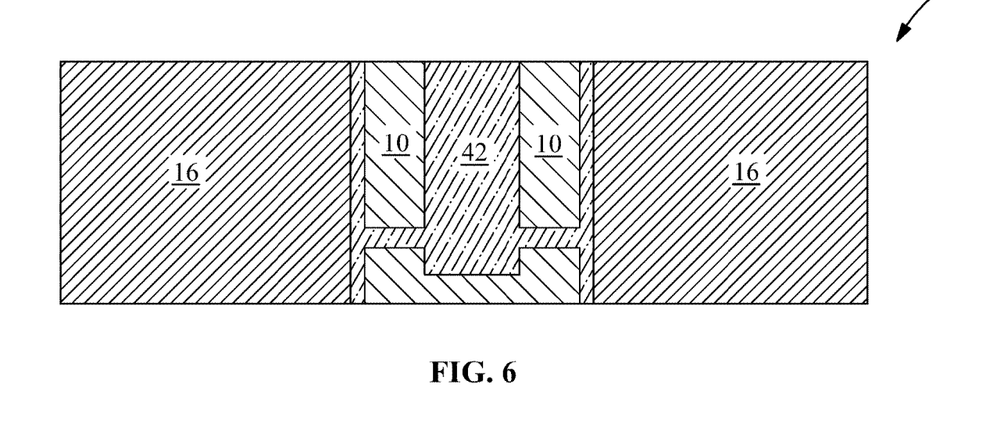
FIG. 6 is a schematic cross sectional view of a brazed article from the braze assembly of FIG. 5 in an embodiment of the present disclosure.

In FIG. 5, the first component 10 includes an extension 50 to give the first component 10 a length greater than the length of the second component 16. This extension 50 permits more brazing material 32 to be placed in the braze chamber 20 prior to brazing. After brazing, enough braze material 42 remains in the braze chamber 20 to extend at least into the bottom of the extension 50. This allows a complete plug to be formed in the brazed article 40 after machining off the extension 50 and any braze material 42 extending into the extension 50 as shown in FIG. 6, rather than having a void space in a portion of the braze chamber 20 of the brazed article 40 as shown in FIG. 3.

Figure 7:
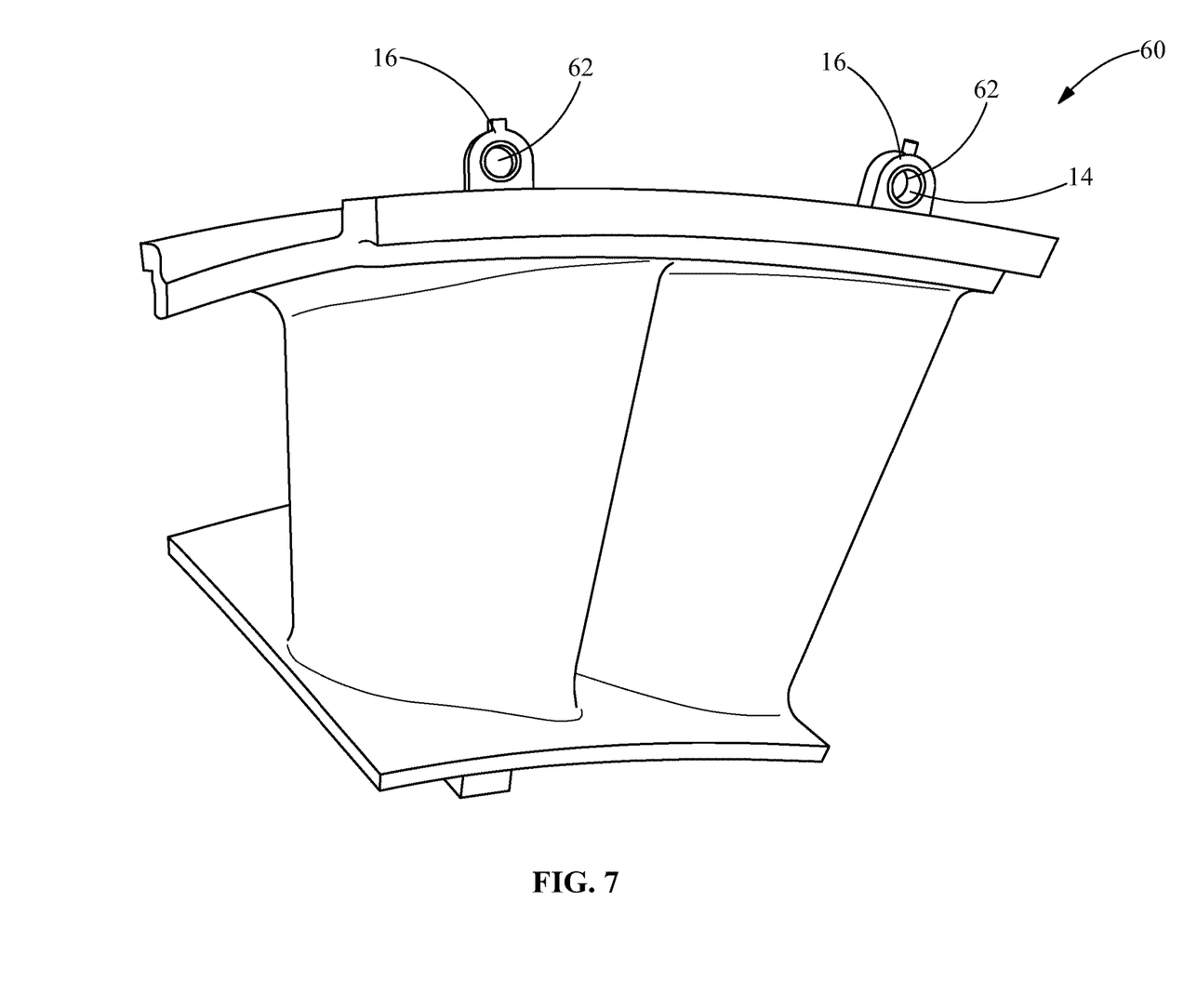
FIG. 7 is a perspective view of a second component in an embodiment of the present disclosure.

In some embodiments, the second component 16 is a tooling lug of a turbine nozzle 60, and the lug hole 62 provides the braze surface 14 for brazing to a first component 10, as shown in FIG. 7.

Methods of the present disclosure are capable of achieving a controlled braze gap 18 with tight tolerances with an internal braze material feeding system in a first component 10 for braze joint design and fabrication. The size of a braze gap 18 may be hard to control. Methods of the present disclosure are capable of successfully providing a narrow gap braze.

In some embodiments, the size of the braze gap 18 is highly uniform with a tight tolerance. Control of the size of the braze gap 18 permits achievement of a good quality braze joint. For example, a braze gap 18 with tight tolerance may be very important for the braze joint to achieve the desired excellent mechanical properties. Braze gap 18 uniformity control may require machining the mating pieces to high tolerances and complementary contours. High tolerance machining may require experienced machining vendors with high quality machines.

In some embodiments, control of the braze gap 18 is capable of eliminating a detrimental phase in the braze material 42, such as a eutectic phase. In some embodiments, the width of the braze gap 18 is in the range of about 10 μm to about 100 μm (about 0.4 mil to about 4.0 mil), alternatively about 10 μm to about 80 μm (about 0.4 mil to about 3.2 mil), alternatively about 10 μm to about 50 μm (about 0.4 mil to about 2.0 mil), alternatively about 30 μm to about 80 μm (about 1.2 mil to about 3.2 mil), or any range or sub-range therebetween. In some embodiments, the width of the braze gap 18 is selected to promote flow of the melted brazing material 32 by capillary action in the braze gap 18.

The external surface 12 and the braze surface 14 may have any complementary contour to provide a uniform braze gap 18. In some embodiments, the external surface 12 and the braze surface 14 are complementary curved surfaces. In some embodiments, the external surface 12 and the braze surface 14 are complementary cylindrical surfaces. In some such embodiments, the first component 10 has a cylindrical geometry. In some embodiments, the external surface 12 and the braze surface 14 are complementary planar surfaces.

The braze chamber 20 may have any geometry that is accessible to supply brazing material 32 and is able to contain the brazing material 32 until the time of brazing. In some embodiments, the braze chamber 20 is substantially cylindrical and formed as a counter-bore by machining. The braze chamber 20 is sized to have sufficient volume to hold sufficient brazing material 32 to fill the braze gap 18 with braze material 42. In some embodiments, the braze chamber 20 may have walls with an irregular geometry. Although the braze chamber 20 is shown as extending below the bottom of the internal channels 22 in FIG. 1 through FIG. 6, the bottom of the braze chamber 20 may alternatively be aligned with the bottom of the internal channels 22 or be located above the bottom of the internal channels 22.

The at least one internal channel 22 may have any geometry that provides fluid communication between the braze chamber 20 and the external surface 12. In some embodiments, the internal channel 22 has a cylindrical geometry. In some embodiments, the diameter of the cylindrical internal channel 22 is in the range of about 0.5 mm to about 5 mm (about 20 mil to about 200 mil), alternatively about 0.75 mm to about 3.8 mm (about 30 mil to about 150 mil), alternatively about 1.0 mm to about 2.5 mm (about 40 mil to about 100 mil), or any range or sub-range therebetween. In some embodiments, the internal channel 22 has an irregular geometry. In some embodiments, the cross sectional area of the cylindrical internal channel 22 is in the range of about 0.2 $mm^2$ to about 20 $mm^2$ (about 300 $mil^2$ to about 30,000 $mil^2$), alternatively about 0.5 $mm^2$ to about 11 $mm^2$ (about 800 $mil^2$ to about 17,000 $mil^2$), alternatively about 0.8 $mm^2$ to about 5 $mm^2$ (about 1,200 $mil^2$ to about 8,000 $mil^2$), or any range or sub-range therebetween.

The at least one internal channel 22 is preferably a plurality of internal channels 22. The number of internal channels 22 is preferably selected based on the size of the first component 10, with more internal channels 22 being used for larger first components 10. The number of internal channels 22 in the first component may be in the range of two to twelve, alternatively three to ten, alternatively four to eight, any number therein, or any range or sub-range therebetween.

The first component 10 and the second component 16 may be formed of any material capable of being brazed. In some embodiments, the first component 10 and the second component 16 have substantially the same composition. In some embodiments, the first component 10 and the second component 16 have different compositions. In some embodiments, the first component 10 and the second component 16 are formed of a superalloy material. In some embodiments, the superalloy material is a cobalt-based superalloy, a nickel-based superalloy, or an iron-based superalloy.

In some embodiments, the superalloy material has a composition by weight of up to about 15% chromium (Cr), up to about 10% cobalt (Co), up to about 4% tungsten (W), up to about 2% molybdenum (Mo), up to about 5% titanium (Ti), up to about 3% aluminum (Al), up to about 3% tantalum (Ta), incidental impurities, and a balance of Ni.

In some embodiments, the superalloy material has a composition by weight of about 14% Cr, about 9.5% Co, about 3.8% W, about 1.5% Mo, about 4.9% Ti, about 3.0% Al, about 0.1% carbon (C), about 0.01% boron (B), about 2.8% Ta, incidental impurities, and a balance of Ni.

In some embodiments, the superalloy material has a composition by weight of up to about 10% Cr, up to about 8% Co, up to about 4% Ti, up to about 5% Al, up to about 6% W, up to about 5% Ta, incidental impurities, and a balance of Ni.

In some embodiments, the superalloy material has a composition by weight of about 9.75% Cr, about 7.5% Co, about 3.5% Ti, about 4.2% Al, about 6.0% W, about 1.5% Mo, about 4.8% Ta, about 0.08% C, about 0.009% zirconium (Zr), about 0.009% B, incidental impurities, and a balance of Ni.

In some embodiments, the superalloy material has a composition by weight of up to about 8% Co, up to about 7% Cr, up to about 6% Ta, up to about 7% Al, up to about 5% W, up to about 3% rhenium (Re), up to about 2% Mo, incidental impurities, and a balance of Ni.

In some embodiments, the superalloy material has a composition by weight of about 7.5% Co, about 7.0% Cr, about 6.5% Ta, about 6.2% Al, about 5.0% W, about 3.0% Re, about 1.5% Mo, about 0.15% Hf, about 0.05% C, about 0.004% B, about 0.01% yttrium (Y), incidental impurities, and a balance of Ni.

In some embodiments, the superalloy material has a composition by weight of up to about 10% Cr, up to about 8% Co, up to about 5% Al, up to about 4% Ti, up to about 2% Mo, up to about 6% W, up to about 5% Ta, incidental impurities, and a balance of Ni.

In some embodiments, the superalloy material has a composition by weight of about 9.75% Cr, about 7.5% Co, about 4.2% Al, about 3.5% Ti, about 1.5% Mo, about 6.0% W, about 4.8% Ta, about 0.5% niobium (Nb), about 0.15% Hf, about 0.05% C, about 0.004% B, incidental impurities, and a balance of Ni.

In some embodiments, the superalloy material has a composition by weight of up to about 10% Co, up to about 8% Cr, up to about 10% W, up to about 6% Al, up to about 3% Ta, up to about 2% Hf, incidental impurities, and a balance of Ni.

In some embodiments, the superalloy material has a composition by weight of about 9.5% Co, about 8.0% Cr, about 9.5% W, about 0.5% Mo, about 5.5% Al, about 0.8% Ti, about 3.0% Ta, about 0.1% Zr, about 1.0% C, about 0.15% Hf, incidental impurities, and a balance of Ni.

In some embodiments, the first component 10, in combination with the braze material 42, serves as a plug for the second component 16. In some embodiments, the plug fills a through-hole in the second component 16. In some embodiments, the plug fills a counter-bore in the second component 16.

The brazing material 32 may be in any form. In some embodiments, the brazing material 32 is a braze powder. In some embodiments, the brazing material 32 is a braze powder with no binder. In some embodiments, the brazing material 32 is a braze paste.

The brazing material 32 may be nickel-based, cobalt-based, or iron-based and may include copper, aluminum, silicon, silver, and/or gold, depending on the application. In some embodiments, the method is conducive to nickel-based braze fillers of very low ductility that are difficult to form into certain shapes, such as, for example, wires or rings.

In some embodiments, a brazed article 40 has one, more than one, or all of the following characteristics. The first component 10 and the second component 16 are assembled with a tight tolerance. The brazing material 32 is supplied to the braze gap via an internal braze system, preferably including a braze chamber 20 and at least one internal channel 22. A braze filler metal in the form of a powder may be used as the brazing material 32. Nickel-based braze fillers, such as in powder form, are well-suited for methods of the present disclosure. An internal braze material holder, or braze chamber 20, machined into the first component 10, is connected to an external surface 12 of the first component 10 by at least one internal channel 22. The braze chamber 20 holds the brazing material 32 prior to brazing. The internal channels 22 are machined into the first component 10 to connect the braze gap 18 and the braze chamber 20. A tack weld may be used to hold the first component 10 and the second component 16 prior to brazing. Braze paste may be applied to the external surface 12 or the braze surface 14 prior to brazing. A portion or all of the first component 10 may be machined out or may be left as-is after the brazing. The internal channels 22 may be part of the braze joint of the brazed article 40 after brazing.

Any appropriate method of heating the brazing material 32 may be used. In some embodiments, the brazing process is performed on the braze assembly 30 by heating the first component 10 locally by an induction heating system in an inert gas environment, such as an argon box. In other embodiments, the entire braze assembly 30 may be heated, such as in a vacuum furnace.

In some embodiments, a method includes one, more than one, or all of the following steps: forming the external surface 12 of the first component 10, forming the braze surface 14 of the second component 16, forming the braze chamber 20 in the first component 10, forming at least one internal channel 22 in the first component 10, assembling the first component 10 and the second component 16 together, tack welding the first component 10 to the second component 16, loading brazing material 32 into the braze chamber 20, heating the brazing material 32 in the braze chamber 20, and allowing the braze assembly 30 to cool to form the brazed article 40.

In some embodiments, a braze thermal cycle is used to heat the brazing material 32 to a braze temperature. In some embodiments, the braze thermal cycle is automated. In some embodiments, the brazing material 32 is a braze powder.

In some embodiments, the braze powder has a composition by weight of about 7.0% Cr, about 4.5% Si, about 3.1% B, about 0.2% phosphorus (P), incidental impurities, and a balance of Ni.

In one embodiment, the braze powder has a composition, by weight percentage, of about 15.0% Cr, about 3.6% B, about 0.02% P, incidental impurities, and a balance of Ni.

In one embodiment, the braze powder has a composition, by weight percentage, of about 19.0% Cr, about 10.1% silicon (Si), about 0.03% B, about 0.02% P, incidental impurities, and a balance of Ni.

In one embodiment, the braze powder has a composition, by weight percentage, of about 14.0% Cr), about 10.0% Co, about 10.0% Al, about 2.75% B, about 2.75% Ta, about to 2.5% Y, incidental impurities, and a balance of Ni.

In one embodiment, the braze powder has a composition, by weight percentage, of between 13.0 and about 14.0% Cr, between about 9.0% and 10.0% Co, between about 3.5% and about 3.8% Al, between about 2.25% and about 2.75% B, incidental impurities, and a balance of Ni.

In some embodiments, the braze thermal cycle includes a braze temperature of about 1080° C. (about 1975° F.) and/or a braze time of about 30 minutes.

After brazing by a method of the present disclosure, a brazed article 40 was cut in half for metallurgical evaluation of the macrostructure of the braze joint. A high quality, tight gap braze joint was observed to have been obtained, as indicated by solid metallurgical bonding between the first component 10 and the second component 16, no lack of braze material in the gap, no cracks in the first component 10, the second component 16, or the braze joint, and no through-wall porosities in the braze joint.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A brazed article comprising:
a first component having a braze chamber and at least one internal channel extending from the braze chamber to an external surface of the first component, the braze chamber being defined by a bottom of the first component and walls of the first component extending from the bottom of the first component;
a second component having at least one braze surface separated from the external surface of the first component by a braze gap; and
a braze material in the braze gap and in the braze chamber;
wherein the first component is brazed to the second component by the braze material in the braze gap.

2. The brazed article of claim 1, wherein the first component is substantially cylindrical and sits in a substantially cylindrical aperture in the second component.

3. The brazed article of claim 1, wherein the braze gap has a width in the range of about 10 μm to about 100 μm (about 0.4 mil to about 4.0 mil).

4. The brazed article of claim 1, wherein each of the at least one internal channel has a cross sectional area in the range of about 0.2 mm$^2$ to about 20 mm$^2$ (about 300 mil$^2$ to about 30,000 mil$^2$).

5. The brazed article of claim 1, wherein the at least one internal channel is in the range of two to twelve internal channels in number.

6. The brazed article of claim 1, wherein the braze material fills the braze chamber.

7. A braze assembly comprising:
a first component having a braze chamber and at least one internal channel extending from the braze chamber to an external surface of the first component, the braze chamber being defined by a bottom of the first component and walls of the first component extending from the bottom of the first component;
a second component having at least one braze surface separated from the external surface of the first component by a braze gap; and
a brazing material contained in the braze chamber.

8. The braze assembly of claim 7, wherein the first component is substantially cylindrical and sits in a substantially cylindrical aperture in the second component.

9. The braze assembly of claim 7, wherein the braze gap has a width in the range of about 10 μm to about 100 μm (about 0.4 mil to about 4.0 mil).

10. The braze assembly of claim 7, wherein the at least one internal channel is in the range of two to twelve internal channels in number.

11. The braze assembly of claim 7, wherein the brazing material has a composition selected from the group consisting of a nickel-based composition, a cobalt-based composition, an iron-based composition, a copper-containing composition, an aluminum-containing composition, a silicon-containing composition, a silver-containing composition, a gold-containing composition, and combinations thereof.

12. The braze assembly of claim 7, wherein the first component is tack-welded to the second component.

13. The braze assembly of claim 7 further comprising a braze filler in the braze gap.

14. The braze assembly of claim 7, wherein the braze chamber is sized to hold sufficient brazing material to fill the braze gap upon brazing the braze assembly.

15. The braze assembly of claim 7, wherein the brazing material is of a quantity sufficient to flow and fill a volume of void space in the braze gap upon heating the brazing material.

16. The braze assembly of claim 7, wherein the at least one internal channel has a cylindrical geometry.

17. The braze assembly of claim 7, wherein the at least one internal channel has a cross sectional area in the range of about 0.2 mm$^2$ to about 20 mm$^2$.

18. The braze assembly of claim 7, wherein the at least one internal channel extends through the walls of the first component above a bottom of the braze chamber.

* * * * *